(No Model.) 2 Sheets—Sheet 1.
G. A. CANNOT.
PROCESS OF MANUFACTURING HYPOCHLOROUS ACID.
No. 523,263. Patented July 17, 1894.
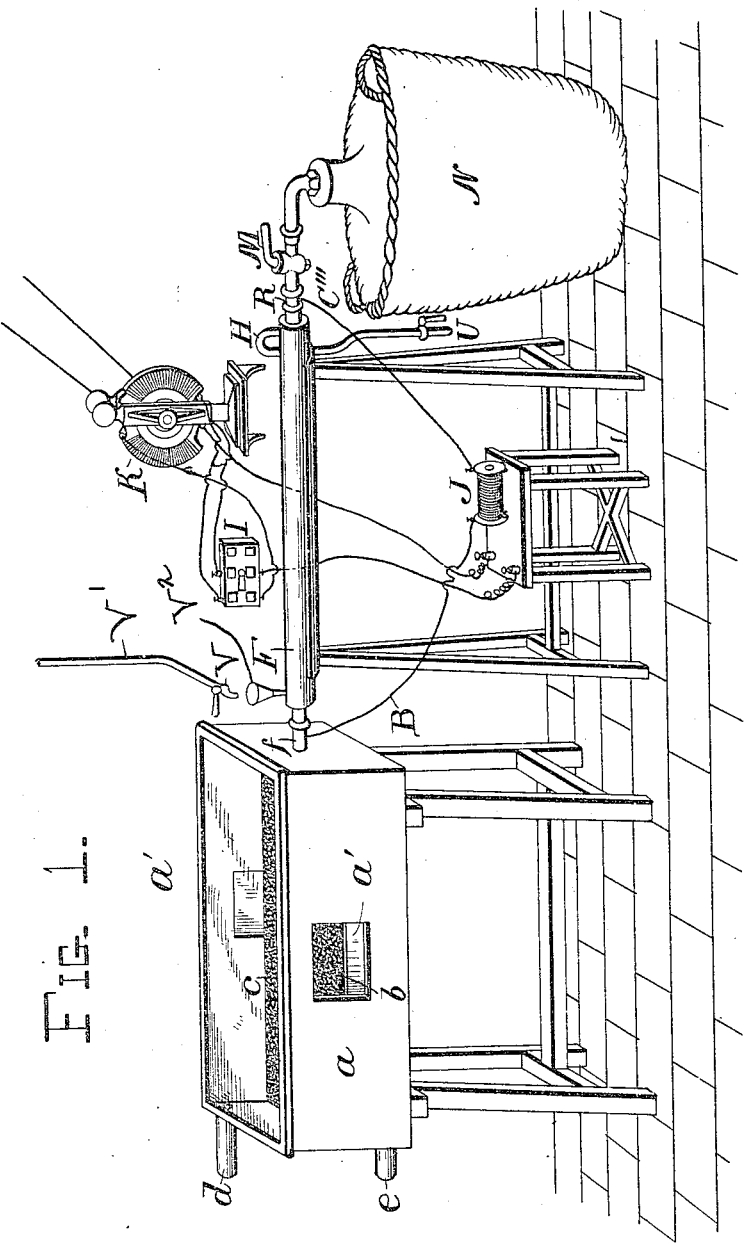
Witnesses
Percy C Bowen
J C Wilson
Inventor
G. A. Cannot,
by Whitman & Wilkinson
Attorneys.

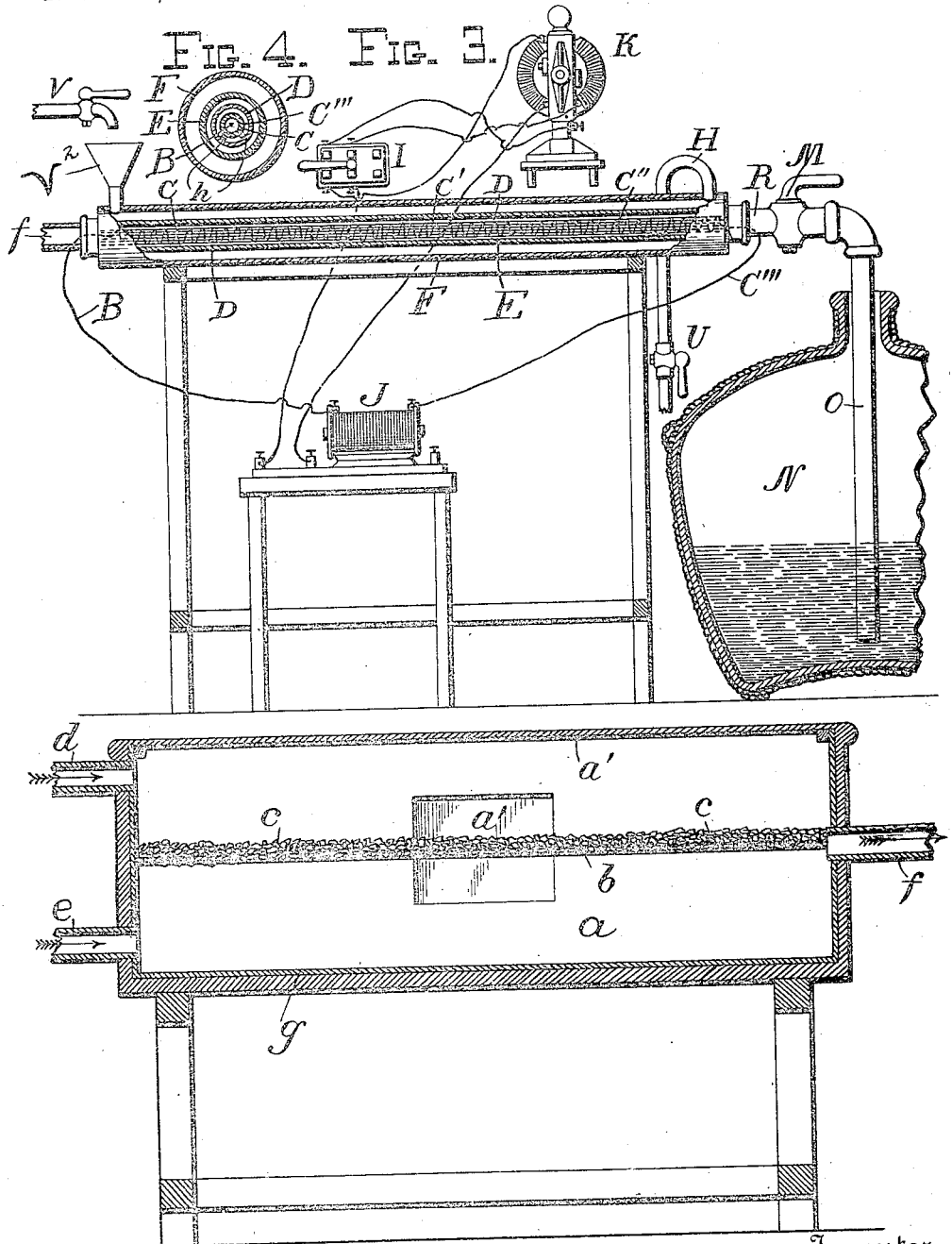

UNITED STATES PATENT OFFICE.

GUSTAVE ADOLPHE CANNOT, OF LONDON, ENGLAND.

PROCESS OF MANUFACTURING HYPOCHLOROUS ACID.

SPECIFICATION forming part of Letters Patent No. 523,263, dated July 17, 1894.

Application filed September 22, 1893. Serial No. 486,218. (No specimens.) Patented in England August 1, 1891, No. 13,102; in France September 18, 1891, No. 216,200; in Belgium September 18, 1891, No. 96,437, and in Austria-Hungary October 5, 1892, No. 21,771.

*To all whom it may concern:*

Be it known that I, GUSTAVE ADOLPHE CANNOT, manufacturer, a subject of the Queen of Great Britain, residing at London, in the county of Middlesex, England, have invented a certain new and useful Improved Process for the Manufacture of Hypochlorous Acid, (for which I have obtained Letters Patent of Great Britain, dated August 1, 1891, No. 13,102; of France, dated September 18, 1891, No. 216,200; of Belgium, dated September 18, 1891, No. 96,437, and of Austria-Hungary, dated October 5, 1892, No. 21,771,) of which the following is a specification.

My invention relates to an improved process for the manufacture of hypochlorous acid, for bleaching purposes, and especially for the bleaching of peat fiber.

The said process is as follows:—Oxygen and chlorine gases are produced in separate generators and are combined in ozone tubes. The chlorine gas on leaving its generator is allowed to bubble up through a solution of chloride of sodium, and the oxygen gas through plain water, contained in suitable vessels, and from thence they pass through washing vessels where they leave any remaining impurities, and into a receiver where they are dried and mixed together, and from which they pass together into an apparatus kept cool by a current of cold water, in which they are submitted to the action of a stream of electric sparks. The mixed gases combine in this apparatus, that is to say the chlorine attaining its required degree of oxidation passes into the state of chlorine monoxide which being unstable and dangerous in a free state is passed into an alkaline solution such as caustic soda or potash, by which it is absorbed.

The oxygen gas is produced preferably by the action of sulphuric acid upon peroxide of manganese, and the chlorine gas is produced in a somewhat similar way to the oxygen, by the action of hydrochloric acid upon peroxide of manganese.

The chlorine and oxygen gases, after leaving the washing vessels pass separately to the apparatus hereinafter described in which—

Figure 1 represents a perspective view of the apparatus. Fig. 2 represents a central longitudinal section of the drying and mixing apparatus. Fig. 3 represents a central longitudinal section of the ozonizing apparatus, and Fig. 4 represents a transverse section of the ozone tubes.

The same parts are indicated by the same letters throughout the several views.

This apparatus forms the subject matter of the claims in my application, Serial No. 486,216, filed September 22, 1893, and is not claimed in this application.

This apparatus consists of a rectangular box $a$ lined with glass and having at its opposite sides and top, windows $a'$ of transparent glass through which the interior can be observed; and having a perforated partition $b$ upon which are placed fragments of pumice stone $c$ impregnated with sulphuric acid, or other desiccating material. The chlorine gas is admitted above through the pipe $d$ and has a specific gravity of 1.33, while the oxygen admitted below through the pipe $e$ has a specific gravity of only 1.05, so that the former has a tendency to pass down through the perforations in the partition $b$, while the latter tends to rise up through them. As fresh bubbles of both gases are constantly arriving they become mixed together and dried, and pass forward and out through a pipe $f$ at the other end of the box $a$, through which they pass to the oxidizing apparatus, Fig. 1, shown on a larger scale in Fig. 3, the object of which is to render the oxidation of the chlorine much more energetic, by the presence of ozone in the air, thus obtaining considerable advantage, in which however the liability to dangerous explosions has to be guarded against where they pass together through tubes in which they are subjected to the action of electric sparks. To avoid such explosions, or to render them harmless, if in spite of precautions they should occur, a glass tube C, C', C'' (Fig. 3) about 0.008 millimeter diameter and 0.002 millimeter thick, and about 1.50 millimeters long, is arranged horizontally, through the center of which passes a copper wire B, coated with silver, gold, or preferably platinum. This wire ends at a short distance (about 0.05 millimeter) from the outer end of the tube C'', its other end B being connected to one of the poles of an electrical induction coil J. Outside the tube C, C', C'', is coiled helically a similar wire C''', which ends at a short distance from the inner end of the tube, its other end being connected to the other pole of the induction coil J. The tube which carries the wires is inserted into a larger glass tube D, in the axis of which it is supported by small glass balls or supports h shown in Fig. 4. The mixed gases pass through the tube E by the pipe f, from the mixing apparatus already described, and a stream of electric sparks which pass between the wires from the induction coil, and through the inner glass tube, which cause the gases to combine rapidly together in the required proportions to form chlorine monoxide.

The tubes containing the gases are insulated in a porcelain tube E glazed inside which is itself contained in an outer case of thin metal F, through which a constant current of cold water is made to circulate from a pipe W and a cock V through a funnel V², passing out through the pipe H and cock U.

The induction coil J is connected with a switch board I, of any suitable construction, and is set in operation by a dynamo K, of sufficient power and of any suitable kind.

The resultant gas, chlorine monoxide, is conveyed away through a pipe R provided with a cock or valve M to a pipe O which descends nearly to the bottom of a vessel or carboy N containing water, with which it unites forming hypochlorous acid.

The reaction is—$Cl_2O + H_2O = 2HClO$. This acid diluted by the excess of water if well stoppered and kept in the dark retains its properties for a long time.

Having thus described my invention, what I claim, and desire to secure by Letters Patent of the United States, is—

The herein described process for the manufacture of hypochlorous acid, which consists in drying and mixing thoroughly oxygen and chlorine gases, in passing electric sparks through the mixture for the purpose of converting the two gases into chlorine monoxide, in cooling the gases while subjected to said electric sparks, and in finally conveying the resultant gaseous product into a suitable solvent, substantially as described.

In testimony whereof I have hereunto set my hand in the presence of two witnesses.

GUSTAVE ADOLPHE CANNOT.

Witnesses:
C. EICHLER,
*Commercial Clerk, 20 Bucklersbury, London, E. C.*
O. LESLIE JOHNSON,
*Gentleman, 20 Bucklersbury, London, E. C.*